United States Patent
Hattori (10) Patent No.: US 7,560,842 B2
(45) Date of Patent: Jul. 14, 2009

(54) PERMANENT MAGNET TYPE ROTATING ELECTRIC MACHINE CAPABLE OF SUPPRESSING DEFORMATION OF ROTOR CORE

(75) Inventor: Hiroyuki Hattori, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/496,435

(22) Filed: Aug. 1, 2006

(65) Prior Publication Data

US 2007/0063607 A1 Mar. 22, 2007

(30) Foreign Application Priority Data

Sep. 21, 2005 (JP) ............... 2005-274343

(51) Int. Cl.
*H02K 21/12* (2006.01)
(52) U.S. Cl. .............. 310/156.53; 310/156.57; 310/156.56
(58) Field of Classification Search ............ 310/156.53, 310/156.57, 43
See application file for complete search history.

(56) References Cited

U.S. PATENT DOCUMENTS

| | | | | |
|---|---|---|---|---|
| 4,954,736 A * | 9/1990 | Kawamoto et al. | ...... | 310/156.21 |
| 6,031,311 A * | 2/2000 | Lee | ........... | 310/156.57 |
| 6,147,428 A * | 11/2000 | Takezawa et al. | ...... | 310/156.57 |
| 6,437,473 B1 * | 8/2002 | Mobius et al. | ......... | 310/156.21 |
| 2002/0047435 A1 * | 4/2002 | Takahashi et al. | ...... | 310/156.56 |
| 2002/0109429 A1 * | 8/2002 | Hattori et al. | ........... | 310/156.53 |
| 2005/0104468 A1 * | 5/2005 | Araki et al. | ............. | 310/156.53 |
| 2005/0140235 A1 * | 6/2005 | Yamagishi et al. | ..... | 310/156.53 |
| 2005/0200223 A1 * | 9/2005 | Tajima et al. | .......... | 310/156.46 |

FOREIGN PATENT DOCUMENTS

| | | |
|---|---|---|
| CN | 1 196 597 A | 10/1998 |
| JP | A 8-237893 | 9/1996 |
| JP | A 9-215236 | 8/1997 |
| JP | 09-294344 | 11/1997 |
| JP | A 2001-286109 | 10/2001 |
| JP | A 2002-034187 | 1/2002 |
| JP | 2002-247784 | 8/2002 |
| JP | A 2004-104962 | 4/2004 |
| JP | A 2004-254466 | 9/2004 |
| JP | 2005-312259 | 11/2005 |

* cited by examiner

*Primary Examiner*—Quyen Leung
*Assistant Examiner*—Alex W Mok
(74) *Attorney, Agent, or Firm*—Oliff & Berridge, PLC (57) ABSTRACT

A rotor core is provided with a plurality of slits extending in the rotation shaft direction, independently of openings. The first slit is arranged at the center of the magnetic pole of the rotor core to be capable of absorbing stress acting on an inner circumferential surface of each opening in a direction normal to a main surface of a permanent magnet. The second slit is arranged between the magnetic poles of the rotor core to be capable of absorbing stress acting in parallel with the main surface of the permanent magnet. Thus, the rotor core is prevented from deforming in a radial outward direction. Further, by forming the first and second slits each in a form not interfering the magnetic path of the magnetic flux by the stator passing inside the rotor core, the motor performance is ensured.

10 Claims, 6 Drawing Sheets

PERMANENT MAGNET TYPE ROTATING ELECTRIC MACHINE CAPABLE OF SUPPRESSING DEFORMATION OF ROTOR CORE

This nonprovisional application is based on Japanese Patent Application No. 2005-274343 filed with the Japan Patent Office on Sep. 21, 2005, the entire contents of which are hereby incorporated by reference.

BACKGROUND OF THE INVENTION

1. Field of the Invention

The present invention relates to a permanent magnet type rotating electric machine, and particularly, to a permanent magnet type rotating electric machine having permanent magnets embedded in a rotor.

2. Description of the Background Art

Figure 10:
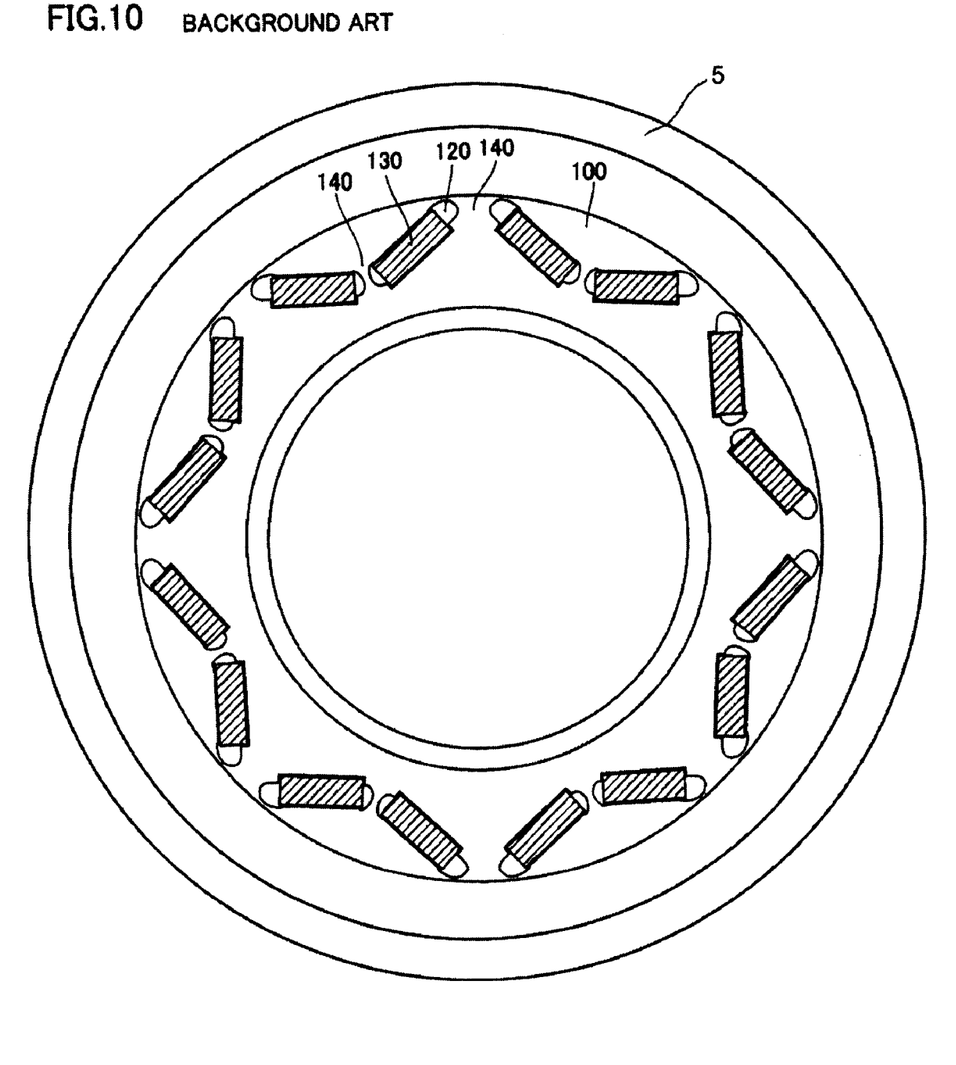
FIG. 10 shows a structure of a rotor in a conventional permanent magnet type rotating electric machine.

In a rotor of a permanent magnet type rotating electric machine, for example as shown in FIG. 10, a plurality of openings 120 are provided to a rotor core 100, and permanent magnets 130 are inserted into openings 120 to create magnetic poles (for example, see Japanese Patent Laying-Open Nos. 2004-104962, 09-215236, 2002-034187, 08-237893, 2001-286109, and 2004-254466). Then, the rotor is driven to rotate based on a rotating magnetic field created by bringing a coil on a not-shown stator side arranged to surround rotor core 100 into conduction. Since a magnetic field is created by permanent magnets 130 for each prescribed magnetic pole, a high output is achieved with a small configuration.

In the permanent magnet type rotating electric machine thus configured, generally the permanent magnets are fixed through an adhesive infilling each opening 120 of rotor core 100. However, with such a fixing method of permanent magnets, when fill properties of the adhesive relative to openings 120 of rotor core 100 is poor, permanent magnets 130 may wobble due to centrifugal force acting on permanent magnets 130 when the rotating electric machine is started or stopped, or when the load abruptly changes. This wobbling may lead to a damage of permanent magnets 130. Rotor core 100 may also be damaged due to stress concentration at the portion where the adhesive is placed.

Further, for filling openings 120 with the adhesive, complicated administration is necessary as to the temperature of the adhesive and rotor core 100, the dimension of a gap between them, and a work posture, and therefore there has been a problem of poor workability.

Accordingly, in recent years, many rotors have been disclosed wherein each permanent magnet is fixed by injecting with pressure a resin member having higher fill properties into the gap between the permanent magnet and the rotor core (for example, see Japanese Patent Laying-Open Nos. 09-215236 and 2002-034187). For example, Japanese Patent Laying-Open No. 09-215236 discloses a magnet embedded type brushless DC motor wherein a gap between a permanent magnet and a rotor core is filled with pressure with a molten die-cast filler, which is then cured, to fix the permanent magnet.

Specifically, in the rotor core, while setting the circumferential dimension of each opening to be greater than the circumferential dimension of each permanent magnet, gaps extending in an axial direction are respectively formed on opposite sides in circumferential direction of the permanent magnet. The gaps are filled with pressure with a molten die-cast filler, which is then cured. This alloy material serves to fix the permanent magnet within the insert portion.

With this configuration, by setting the dimension of the opening in the circumferential direction to be greater than the width dimension of the permanent magnet, a change in the width dimension of the permanent magnet can be addressed. Additionally, by pouring and allowing to cure the molten die-cast filler into the gaps formed on opposite sides in the circumferential direction of the permanent magnet, the permanent magnet can be fixed within the opening irrespective of a change in the width dimension of the permanent magnet and variations of the dimensional tolerance.

However, with the fixing method of permanent magnets using a filler as described above, stress may generated at the rotor core due to a difference in coefficient of linear expansion among the permanent magnets, the heated and cured filler and the rotor core.

That is, since the permanent magnets, the heated and cured filler and the rotor core are made of materials different from one another, they are different in coefficient of linear expansion. Accordingly, in a manufacturing process of the rotor, when heat is applied to cure the filler, with which the gap between the permanent magnet and the opening have been filled with pressure, each of them expands by a different amount. When the filler is cured, sometimes stress is generated at the inner circumferential surface of the opening in the direction compressed by the filler.

Additionally, such stress may be generated at the rotor core also when the permanent magnet, the filler and the rotor core expand due to heat being generated in association with the operation of the rotating electric machine.

Accordingly, receiving such stress attributed to the filler, the rotor core may greatly deform. Then, when the rotor core deforms, the length of the air gap between the outer circumferential surface of the rotor core and the inner circumferential surface of stator 5 becomes irregular, which may impair the output performance of the rotating electric machine.

Additionally, in the rotor core, as shown in FIG. 10, stress may remain at a bridge portion 140 formed between adjacent openings 120. Therefore, the reliability of the rotating electric machine is impaired.

Specifically, the bridge portion is designed to have the smallest possible width in order to prevent performance deterioration due to a magnetic flux of the permanent magnet leaking from N pole through the portion to S pole. However, the strength of the bridge portion cannot be maintained due to the aforementioned stress remaining therein, which impairs the reliability of the rotating electric machine.

SUMMARY OF THE INVENTION

An object of the present invention is to provide a permanent magnet type rotating electric machine that is capable of suppressing deformation of a rotor core.

According to the present invention, a permanent magnet type rotating electric machine includes a stator and a rotor provided rotatably relative to the stator. The rotor includes a rotor core having a plurality of openings formed along a circumferential direction, a plurality of permanent magnets inserted into the plurality of openings, respectively, to each form a magnetic pole, and a filler pressurized to infill a gap between an inner circumferential surface of each of the plurality of openings and an outer circumferential surface of each of the plurality of permanent magnets. The rotor core further has a hole arranged along the circumferential direction of the rotor core to absorb deformation of the rotor core in a radial outward direction.

According to the permanent magnet type rotating electric machine described above, since the stress acting on the rotor core that is attributed to the filler for fixing the permanent magnets can be absorbed by the hole, the deformation of the rotor core can be suppressed. As a result, the output performance of the permanent magnet type rotating electric machine can be ensured.

According to the present invention, a permanent magnet type rotating electric machine includes a stator and a rotor provided rotatably relative to the stator. The rotor includes a rotor core having a plurality of openings formed along a circumferential direction, a plurality of permanent magnets inserted into the plurality of openings, respectively, to each form a magnetic pole, and a thermosetting filler infilling a gap between an inner circumferential surface of each of the plurality of openings and an outer circumferential surface of each of the plurality of permanent magnets. The rotor core further has a hole arranged along the circumferential direction of the rotor core to absorb deformation of the rotor core in a radial outward direction.

According to the permanent magnet type rotating electric machine described above, since the stress acting on the rotor core that is attributed to the thermosetting filler for fixing the permanent magnets can be absorbed by the hole, the deformation of the rotor core can be suppressed. As a result, the output performance of the permanent magnet type rotating electric machine can be ensured.

Preferably, the hole includes a first hole arranged between each of the magnetic poles of the rotor core, and a second hole arranged at a substantial center of each of the magnetic poles of the rotor core.

Preferably, the first hole is arranged to absorb stress acting on the inner circumferential surface of each of the plurality of openings in parallel with a main surface of the permanent magnet, and the second hole is arranged to absorb stress acting on the inner circumferential surface of each of the plurality of openings in a direction of normal to the main surface of the permanent magnet.

According to the permanent magnet type rotating electric machine described above, since the first hole and the second hole absorb the stress acting on the rotor core between the magnetic poles and the stress acting on the center of each of the magnetic poles, respectively, the deformation of the rotor core at the pertinent portions can effectively be suppressed.

Preferably, the first and second holes are each set to have a form avoiding interference with a magnetic path of a magnetic flux by the stator passing inside the rotor core.

According to the permanent magnet type rotating electric machine described above, since the first and second holes do not block the magnetic path of the magnetic flux by the stator passing inside the rotor core, the magnetic flux will not be reduced. As a result, reduction in the output torque of the rotating electric machine can be avoided.

Preferably, the plurality of openings are arranged so that a pair of the plurality of openings forms a substantial V-shape pointing to a rotation shaft of the rotor. The plurality of permanent magnets, in a state being inserted into the pair of openings, constitute a single magnetic pole. The first hole is arranged between each of the magnetic poles of the rotor core, and the second hole is arranged at a substantial center of each of the magnetic poles of the rotor core.

According to the permanent magnet type rotating electric machine described above, stress is prevented from remaining in a bridge portion formed between adjacent openings. As a result, the strength of the bridge portion can be maintained, and the reliability of the permanent magnet type rotating electric machine can be ensured.

Preferably, the rotor core is constituted by a plurality of electromagnetic steel plates stacked in the rotation shaft direction and includes a caulking member caulking the plurality of electromagnetic steel plates. The first and second holes are each provided in a form being continuous with the caulking member.

According to the permanent magnet type rotating electric machine described above, using the caulking member that is means for fixing the rotor core as means for absorbing the stress acting on the rotor core, it is not necessary to provide a hole. Therefore, the deformation of the rotor core can more easily be prevented.

Preferably, the first hole is arranged on an inner circumferential side of the rotor core.

According to the permanent magnet type rotating electric machine described above, since the degree of freedom in designing the shape of the first hole can be improved, the deformation of the rotor core can effectively be prevented.

According to the present invention, since the stress acting on the rotor core attributed to the filler for fixing the permanent magnets can be absorbed by the holes, the deformation of the rotor core can be suppressed. As a result, the output performance of the permanent magnet type rotating electric machine can be ensured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention are described referring to the drawings. In the drawings, identical reference characters indicate identical or corresponding components.

First Embodiment

Figure 1:
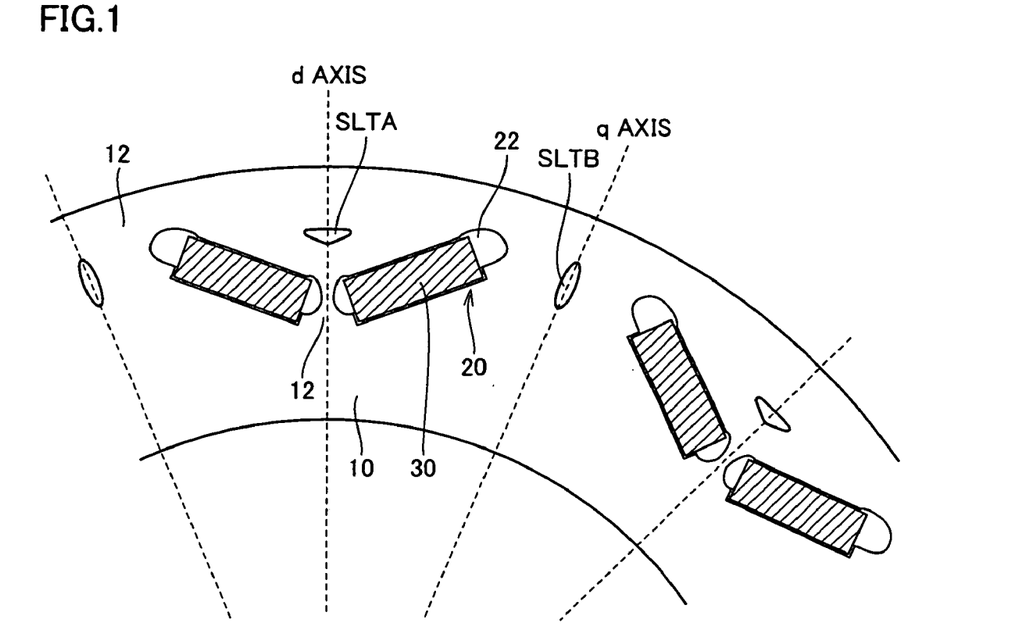
FIG. 1 is an illustration for describing a structure of a rotor in a permanent magnet type rotating electric machine according to a first embodiment of the present invention.

FIG. 1 is an illustration for describing a structure of a rotor in a permanent magnet type rotating electric machine according to a first embodiment of the present invention. FIG. 1 is an enlarged view of the rotor when seen from the rotation shaft direction.

Referring to FIG. 1, the rotor includes a rotor core 10 provided at the outer periphery of a not-shown rotation shaft, and permanent magnets 30 arranged at rotor core 10.

Rotor core 10 is, for example, formed by a plurality of electromagnetic steel plates stacked in the rotation shaft direction of the rotor. Openings 20 are provided in a plurality of numbers along the circumferential direction of rotor core 10. When punching electromagnetic steel plates to obtain thin plates forming rotor core 10, openings 20 are punched simultaneously, and formed in parallel with the rotation shaft as the thin plates are stacked.

As shown in FIG. 1, openings 20 are arranged at the outer periphery end of rotor core 10 so that a pair of adjacent openings 20 forms a V-shape pointing radial inward direction. Between adjacent openings 20, a bridge portion 12 is naturally formed. It is noted that the arrangement of openings 20 is not limited thereto.

Each of openings 20 has a substantially elongated quadrangular shape. Permanent magnets 30 are fixed to rotor core 10 by a filler 22 in a state inserted into openings 20. A pair of permanent magnets 30 fixed to a pair of openings 20 forms a single magnetic pole in the rotor of the permanent magnet type rotating electric machine.

Filler 22 is for example made of a thermosetting filler. After a gap between the inner circumferential surface of opening 20 and the outer circumferential surface of permanent magnet 30 is filled with filler 22, by applying heat to allow filler 22 to cure, permanent magnet 30 is fixed to rotor core 10. Methods for filling the gap with filler 22 include a method of injecting with pressure filler 22 into a gap between opening 20 and permanent magnet 30, a method of inserting permanent magnet 30 to which filler 22 is applied in advance into opening 20, and the like.

Here, each of rotor core 10, filler 22 and permanent magnets 30 expands by heating for curing filler 22 in a manufacturing step of the rotor. However, since rotor core 10, filler 22 and permanent magnets 30 are made of the materials different from one another, they are different in coefficient of linear expansion. Accordingly, they are different in a change amount (expansion amount) when heated. As a result, as shown in FIG. 2, stress F1-F3 directed outward of the outer circumferential surface of each permanent magnet 30 occurs in the inner circumferential surface of rotor core 10.

Figure 2:
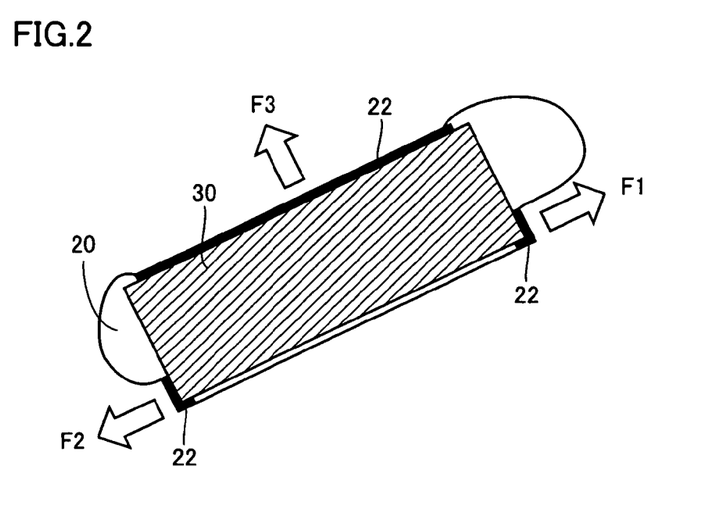
FIG. 2 is an illustration for describing stress acting on a rotor core.

Specifically, referring to FIG. 2, in rotor core 10, the stress acting on the inner circumferential surface of opening 20 is expressed by stress F1 and stress F2 acting in parallel with the main surface of each permanent magnet, and stress F13 acting in the normal direction to the main surface of each permanent magnet.

First, stress F1 and stress F2 are the stress that occur attributed to filler 22 with which a gap between a side surface of each permanent magnet 30 and an internal surface of each opening 20 is filled. When each opening 20 has a shape shown in FIG. 2, for example, the stress is concentrated at the corners of each permanent magnet 30 at which the width of the gap is relatively small.

Next, stress F3 is the stress that occurs attributed to filler 22 with which a gap between a main surface of each permanent magnet 30 and an internal surface of each opening 20 is filled. Stress F3 acts toward the outer periphery of rotor core 10.

While stress acting on the inner circumferential surface of opening 20 reversely to stress F3 may possibly occur, it is not considered herein since the effect thereof to deformation of rotor core 10 is smaller than that of stress F3.

Occurrence of such stress F1-F3 at the inner circumferential surface of each opening 20 may deform the outer circumferential surface of rotor core 10 in the radial outward direction, as described below.

Figure 3:
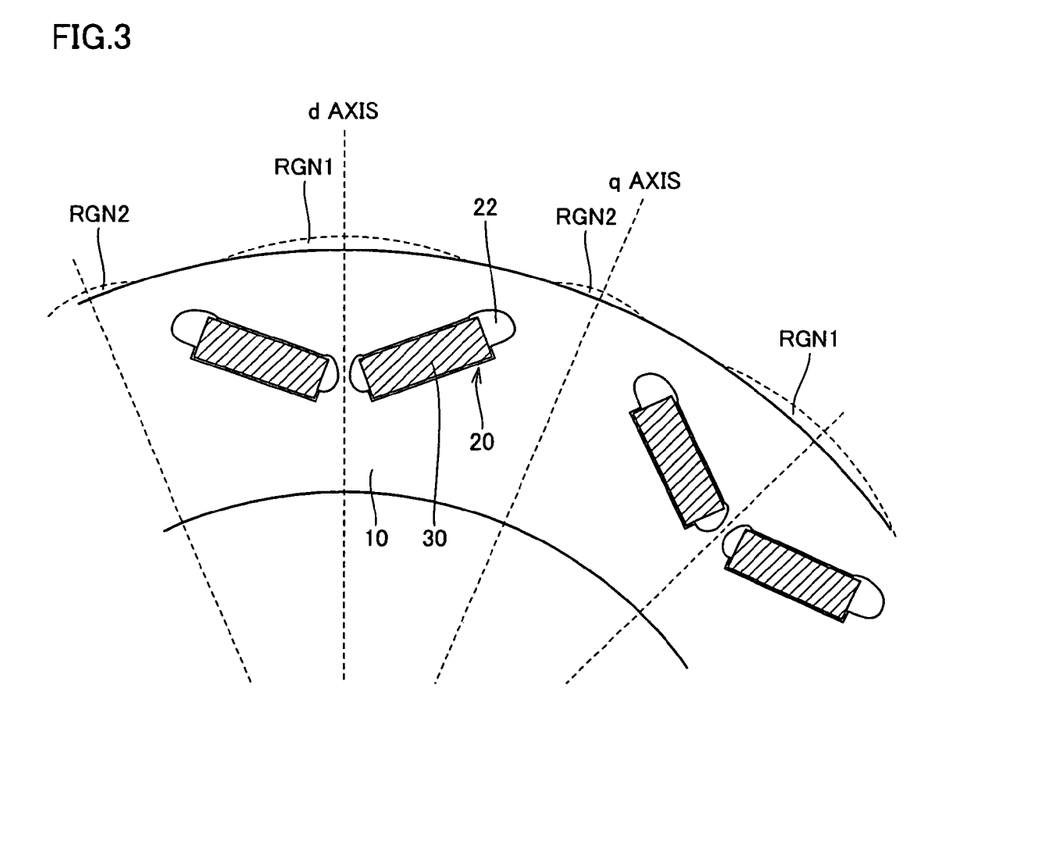
FIG. 3 is an illustration for describing the effect of stress acting on the rotor core.

FIG. 3 is an illustration for describing the effect of the stress acting on rotor core 10.

Referring to FIG. 3, when rotor core 10 receives stress F1-F3 shown in FIG. 2, its outer circumferential surface may deform as indicated by regions RGN1 and RGN2.

Region RGN1 corresponds to a deformed portion of rotor core 10 resulted from stress F3 shown in FIG. 2. To rotor core 10, for each magnetic pole, stress F3 acts on the inner circumferential surface of each pair of openings 20 toward the outer periphery of rotor core 10. As such, the resultant of forces of stress F3 acts in the radial outward direction along a d axis (which easily passes a magnetic flux and corresponds to a substantial center of a magnetic pole). As a result, as shown by region RGN1, such a deformation occurs that the outer diameter of rotor core 10 is increased in the d axis direction as indicated by region RGN1.

On the other hand, region RGN2 corresponds to a deformed portion of rotor core 10 resulted from stress F1 and stress F2 shown in FIG. 2. Between magnetic poles of rotor core 10, stress F1 acting on one of openings 20 of one magnetic pole and stress F2 acting on one of openings 20 of the other magnetic pole act. The resultant of forces of stress F1 and stress F2 acts in the radial outward direction along a q axis (which hardly passes a magnetic flux and corresponds to a portion between magnetic poles), and as a result such a deformation occurs that the outer diameter is increased in the q axis direction as indicated by region RGN2.

When rotor core 10 deforms as shown in FIG. 3 and the outer diameter of rotor core 10 partially increases, in the deformed portion, the width of an air gap arranged between the outer circumferential surface of rotor core 10 and the inner circumferential surface of a not-shown stator is narrowed. As a result, the air gap becomes uneven over the circumferential direction, whereby the output torque of rotating electric machine is decreased.

Accordingly, the present embodiment is characterized in forming rotor core 10 to absorb stress F1-F3 occurring attributed to filler 22 interposed between rotor core 10 and each permanent magnet 30.

Specifically, referring to FIG. 1 again, independently of openings 20, rotor core 10 is further provided with a plurality of slits SLTA and SLTB extending in the rotation shaft direction (the direction perpendicular to the surface of the drawing). In the present embodiment, slits SLTA and SLTB can largely be classified into the following two, by the direction in which stress acts.

First, slit SLTA is arranged at rotor core 10 to absorb stress F3 acting in the normal direction to the main surface of each permanent magnet 30. In FIG. 1, slit SLTA is arranged on the d axis in the drawing and at a portion near the outer periphery of rotor core 10 (corresponding to the opposite ends of a V-shape).

That is, to rotor core 10, the resultant of forces of stress F3 acting on each pair of openings 20 acts in the radial outward direction along the d axis, as described above. Slit SLTA is positioned on the d axis to absorb the resultant stress. As a result, the deformation of rotor core 10 as indicated by region RGN1 shown in FIG. 3 is suppressed.

Next, slit SLTB is arranged to absorb stress F1 and stress F2 acting in parallel with the main surface of each permanent magnet 30. In FIG. 1, it is arranged to be positioned on the q axis that corresponds to the portion between the magnetic poles.

That is, between the magnetic poles of rotor core 10, the resultant of forces of stress F1 and stress F2 respectively acting on openings 20 of adjacent magnetic poles acts in the radial outward direction along the q axis. Slit SLTB is arranged on the q axis, and absorbs the resultant stress. As a result, the deformation of rotor core 10 as indicated by region RGN2 shown in FIG. 3 is suppressed.

As above, according to the present invention, as stress F1-F3 acting on rotor core 10 is efficiently absorbed by slits SLTA and SLTB, the deformation of rotor core 10 can be suppressed. As a result, the air gap in the rotating electric machine can be maintained to be uniform, and the output performance can be ensured.

Here, the present embodiment is further characterized in determining each form of slits SLTA and SLTB considering the flow of a magnetic flux passing through rotor core 10.

In particular, in the rotating electric machine including rotor core 10 configured as shown in FIG. 1, when the coil of the stator arranged on the outer periphery side of rotor core 10 is brought into conduction, the magnetic flux by the stator passes inside rotor core 10.

Figure 4:
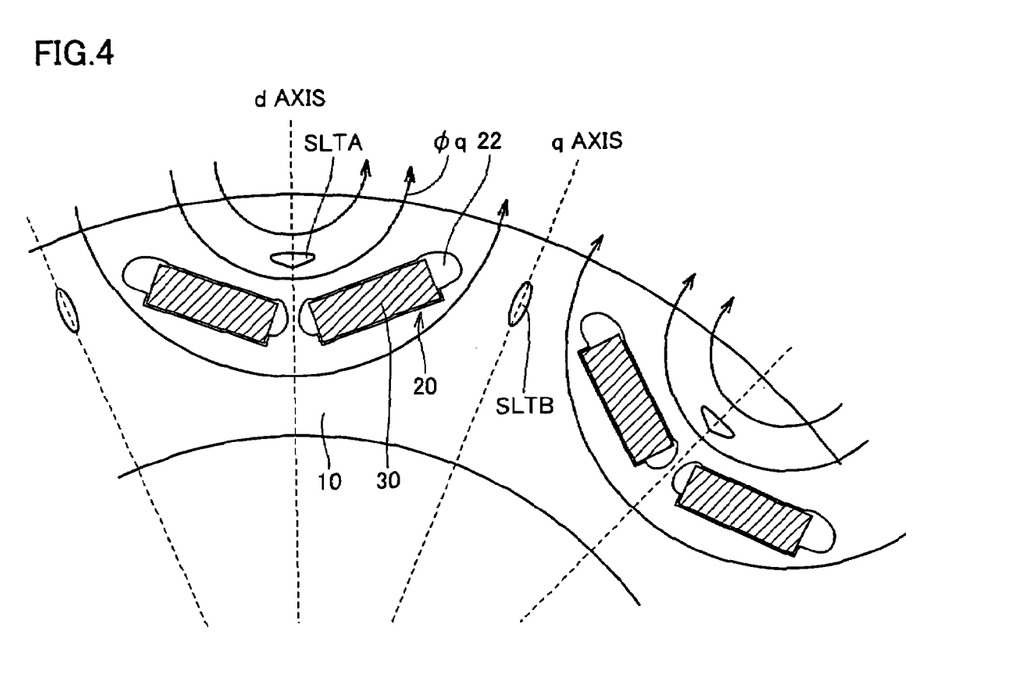
FIG. 4 is a schematic diagram for describing a magnetic path of a magnetic flux by a stator.
Figure 5:
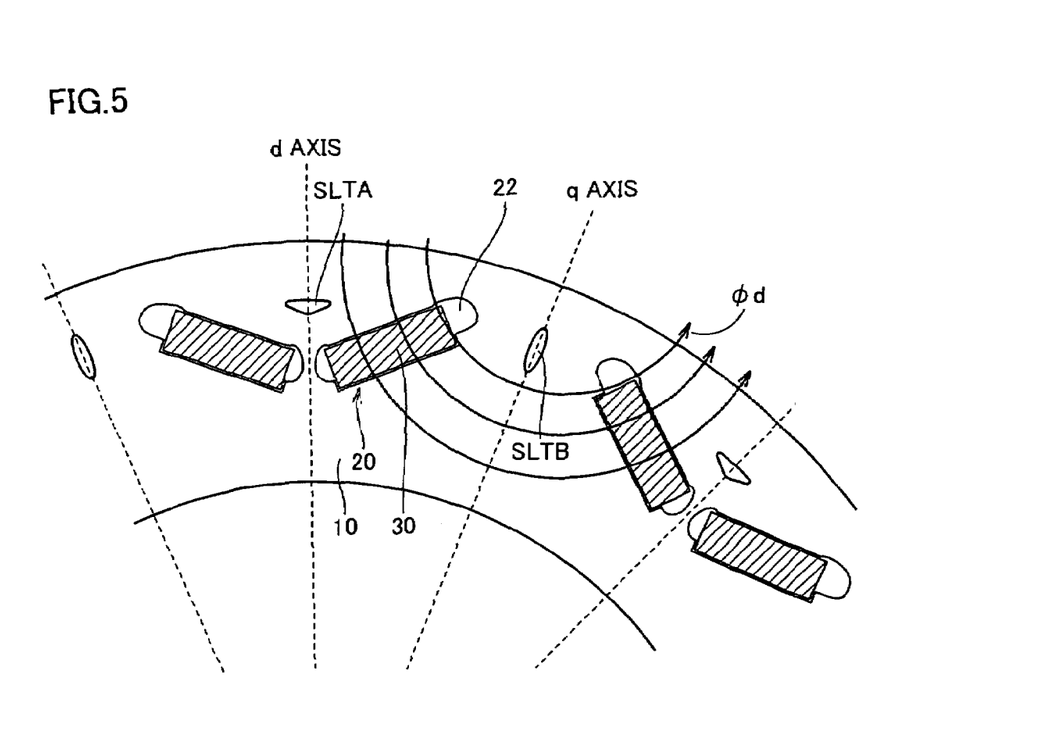
FIG. 5 is a schematic diagram for describing a magnetic path of a magnetic flux by the stator.

FIGS. 4 and 5 are schematic diagrams for describing a magnetic path of the magnetic flux by the stator.

When an AC current is passed through the stator, a rotating magnetic field created by the stator causes a magnetic flux to pass from the stator to rotor core 10. q axis magnetic flux $\phi q$ passes through rotor core 10 forming an arc therein as indicated by arrows in FIG. 4. d axis magnetic flux $\phi d$ passes through rotor core 10 forming an arc therein as indicated by arrows in FIG. 5.

Through the torque generated by magnetic attraction and magnetic repulsion between permanent magnets 30 and the magnetic poles of the stator, the rotor rotates. Accordingly, if the magnetic path of the magnetic flux by the stator is blocked inside rotor core 10, the magnetic flux will be reduced and the output torque of the rotating electric machine is reduced.

Accordingly, in the present embodiment, in order to prevent the magnetic flux from the stator coil from being reduced at rotor core 10, slits SLTA and SLTB are formed so as not to block the magnetic path of the magnetic flux by the stator.

Specifically, slits SLTA arranged at a magnetic pole is formed in a substantially triangular shape as shown in FIG. 1, constituted by two sides substantially parallel to a pair of permanent magnets 30 and a side along the outer periphery. In the substantial triangular shape, the degree of an angle formed between the two sides substantially parallel to a pair of permanent magnets 30 is set to conform to the magnetic path of the passing magnetic flux while considering the number of the magnetic poles and the arrangement of the pair of permanent magnets 30 for each rotor core 10.

The shape of slit SLTA is not limited to a substantial triangular shape so long as it does not block passage of the magnetic flux by the stator, and it may be a substantially circular shape.

Slit SLTB arranged between the magnetic poles is formed in a substantial ellipse having is major axis in the radial direction. Here, the minor axis of the substantial ellipse, that is, the length in the circumferential direction is set to be short enough for not blocking the passage of the magnetic flux.

As above, in rotor core 10 according to the present invention, slits SLTA and SLTB have their position and shape set so that they can absorb the stress occurring at the inner circumferential surface of opening 20 and so as not to block the magnetic path of the magnetic flux passing through rotor core 10. As a result, the deformation of rotor core 10 attributed to the filler can be suppressed and the output performance of the rotating electric machine can be ensured.

Further, stress is prevented from remaining in bridge portion 12 of rotor core 10, and the rotating electric machine of high reliability can be realized.

It is noted that, as to the slits provided to rotor core 10, the position and shape as described in the following may be employed, so long as the direction of stress attributed to the filler and the magnetic path of the magnetic flux by the stator are considered.

First Modification

Figure 6:
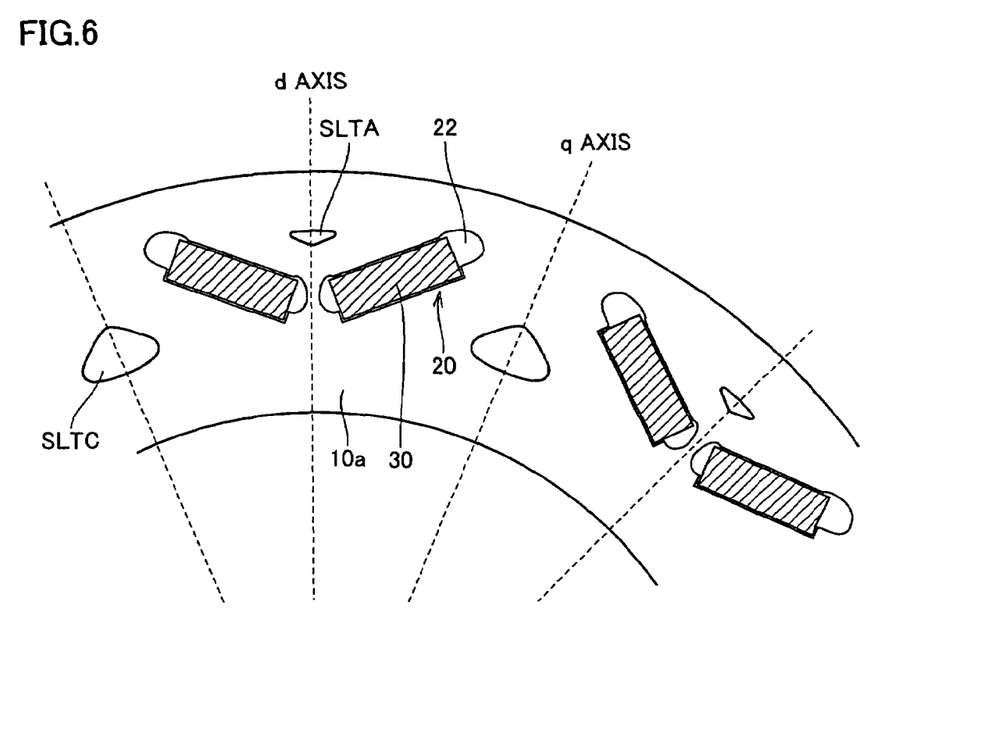
FIG. 6 is an illustration for describing a structure of a rotor in the permanent magnet type rotating electric machine according to a first modification of the first embodiment of the present invention.

FIG. 6 is an illustration for describing a structure of a rotor in a permanent magnet type rotating electric machine according to a first modification of the first embodiment of the present invention.

Referring to FIG. 6, a rotor core 10*a* corresponds to rotor core 10 in FIG. 1 of which slit SLTB is replaced by a slit SLTC. Slit SLTC is similar to slit SLTB in FIG. 1 in that it is arranged on the q axis, but different in that it is arranged on the inner circumferential side of rotor core 10*a*.

While slit SLTC has the function of absorbing stress F1 and stress F2 similarly to slit SLTB, it's shape is greater than that of slit SLTB. This is enabled by the arrangement of slit SLTC on the inner circumferential side of rotor core 10*a*, which allows the shape of slit SLTC to be set not being limited by the magnetic path of the magnetic flux by the stator. That is, according to the present modification, the degree of freedom in designing the slit can be improved. The present modification is particularly effective when the stress acting on the rotor core is relatively great or when the width between the magnetic poles is excessively narrow.

Second Modification

Figure 7:
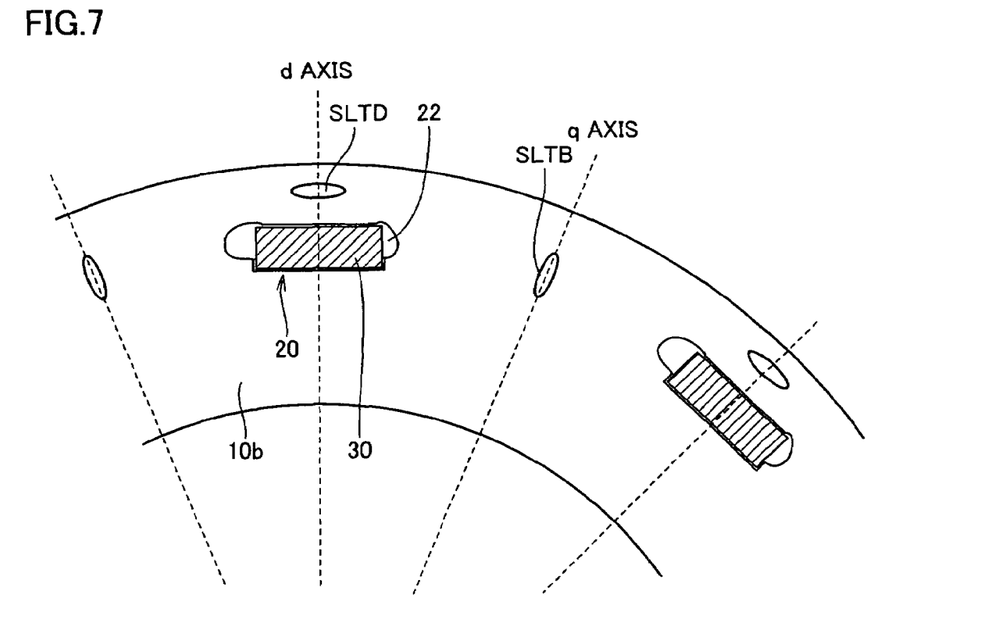
FIG. 7 is an illustration for describing a structure of a rotor in a permanent magnet type rotating electric machine according to a second modification of the first embodiment of the present invention.

FIG. 7 is an illustration for describing a structure of a rotor in a permanent magnet type rotating electric machine according to a second modification of the first embodiment of the present invention.

Referring to FIG. 7, a single opening 20 is arranged for each magnetic pole in a rotor core 10*b*. That is, the rotor according to the present modification is different from the rotor shown in FIG. 1, in which the magnetic pole is formed by a pair of permanent magnets 30 arranged in a V-shape, in that the magnetic pole is formed of a single permanent magnet arranged as inserted into single opening 20.

In such a configuration of the rotor, in order to absorb stress acting on rotor core 10*b*, a slit SLTD is provided. Specifically, as shown in FIG. 6, slit SLTD is provided at the center of the magnetic pole and on the outer circumferential side of rotor core 10*b*.

While slit SLTD has the function of absorbing stress F3 similarly to slit SLTA, it has its shape set to a substantial ellipse having the major axis in the circumferential direction, considering the magnetic path of the magnetic flux by the stator.

Slit SLTB arranged between the magnetic poles are structured similarly to slit SLTB in FIG. 1. That is, slit SLTB is arranged between the magnetic poles (on the q axis) to absorb stress F1 and stress F2.

As above, according to the first embodiment of the present invention, the stress acting on the rotor core attributed to the filler for fixing the permanent magnets can be absorbed by the slits. Thus, the permanent magnets can be protected from any damage and deformation of the rotor core can be suppressed. As a result, the output performance of the permanent magnet type rotating electric machine can be ensured.

Further, since stress is prevented from remaining in the bridge portion of the rotor core, the rotating electric machine of high reliability can be realized.

Second Embodiment

Figure 8:
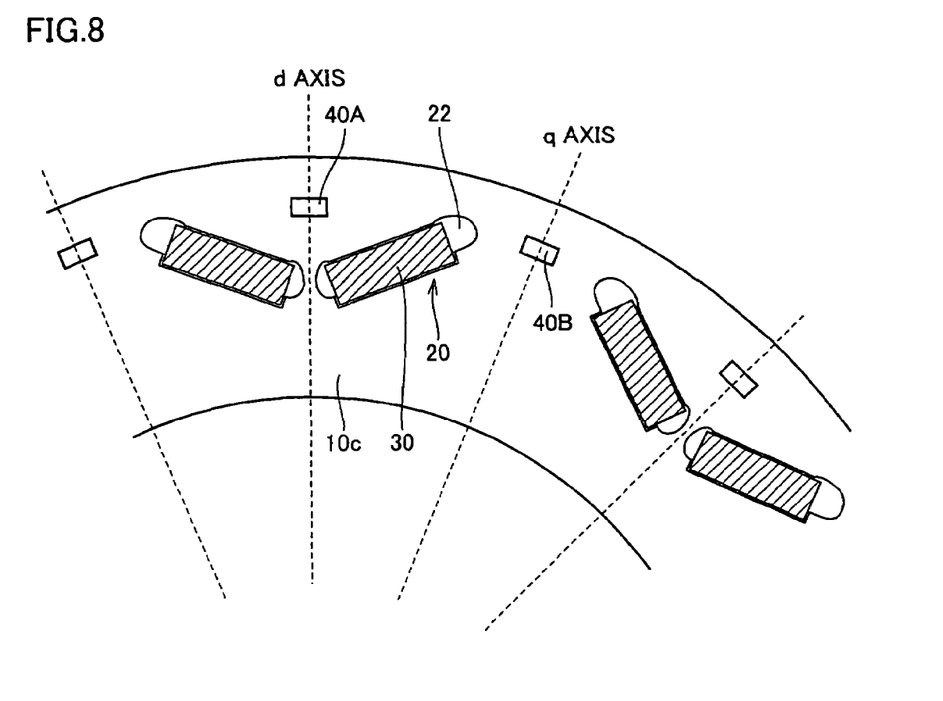
FIG. 8 is an illustration for describing a structure of a rotor in the permanent magnet type rotating electric machine according to a second embodiment of the present invention.

FIG. 8 is an illustration for describing a structure of a rotor in a permanent magnet type rotating electric machine according to a second embodiment of the present invention.

Referring to FIG. 8, a rotor core 10c includes a plurality of openings 20 and caulking members 40a and 40b. Rotor core 10c in FIG. 7 corresponds to rotor core 10 in FIG. 1 of which slits SLTA, SLTB are replaced by caulking members 40A and 40B.

Figure 9:
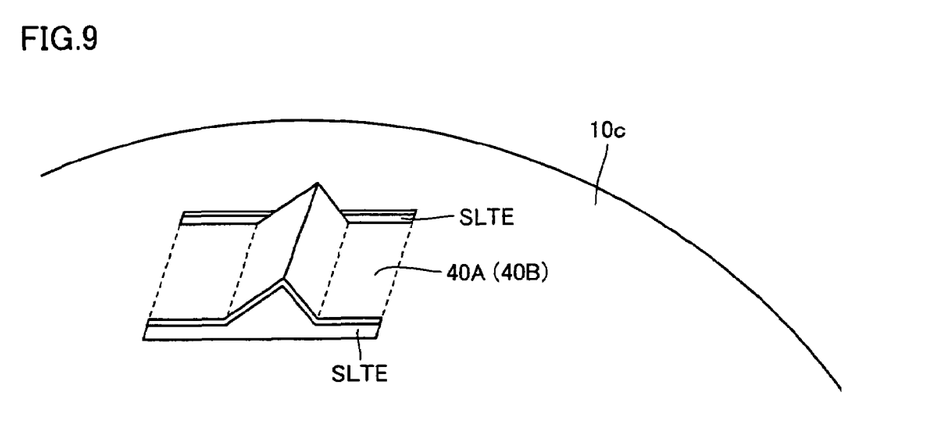
FIG. 9 is a schematic diagram for describing a caulking member in FIG. 8.

Specifically, caulking members 40A and 40B each have a caulking portion projecting in the rotation shaft direction and slits SLTE provided continuously from the caulking portion, as shown in FIG. 9. The caulking portion and slits SLTE are simultaneously formed when punching electromagnetic steel plate to obtain thin plates forming rotor core 10, and formed in parallel with the rotation shaft as the thin plates are stacked. By caulking the stacked electromagnetic steel plates, the adjacent electromagnetic steel plates are fitted to one another and integrated. Thus, the plurality of electromagnetic plates are fixed in the rotation shaft direction and in the circumferential direction to constitute an integrated rotor core 10c. Here, on opposite sides of the caulking portions, slits SLTE extending in the rotation shaft direction are formed simultaneously.

The present embodiment is characterized in that caulking members 40A and 40B as the means for fitting a plurality of electromagnetic steel plates constituting rotor core 10c are also used as means for absorbing the stress of rotor core 10c.

Specifically, as shown in FIG. 8, caulking member 40A is arranged at the center of the magnetic pole and on the outer circumferential side of rotor core 10c. Slits SLTE of caulking member 40A serve to absorb stress F3 similarly to slit SLTA in FIG. 1.

Caulking member 40B is arranged between the magnetic poles and on the outer circumferential side of rotor core 10c. Slits SLTE of caulking member 40B serve to absorb stress F1 and stress F2 similarly to slit SLTB in FIG. 1.

As above, according to the second embodiment of the present invention, by using existing caulking members of the rotor core as means for absorbing the stress acting on the rotor core, provision of slits is not required and deformation of the rotor core can more easily be suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A permanent magnet type rotating electric machine, comprising:

a stator; and a rotor provided rotatably relative to the stator, the rotor comprising a rotor core having a plurality of openings formed along a circumferential direction, a plurality of permanent magnets, each individual one of the plurality of magnets being inserted into a separate one of the plurality of openings, to each form a magnetic pole, and a filler pressurized to infill a gap between an inner circumferential surface of each of the plurality of openings and an outer circumferential surface of each of the plurality of permanent magnets, wherein the rotor core further comprises a first hole arranged between each of the magnetic poles of the rotor core and a second hole arranged at a substantial center of each of the magnetic poles of the rotor core and arranged along the circumferential direction of the rotor core to absorb deformation of the rotor core in a radial outward direction, wherein the first hole is either (a) substantially elliptical with a major axis that lies in a radial direction of the rotor core or (b) located on an inner circumferential side of the rotor core and is substantially triangular, including a first side and a second side, each of the first side and the second side being separately substantially parallel to an adjacent one of the plurality of permanent magnets, and wherein the second hole is substantially triangular and includes a first side and a second side, each of the first side and the second side being separately substantially parallel to an adjacent one of the plurality of permanent magnets.

2. The permanent magnet type rotating electric machine according to claim 1, wherein the first hole is arranged to absorb stress acting on the inner circumferential surface of each of the plurality of openings in parallel with a main surface of the permanent magnet, and the second hole is arranged to absorb stress acting on the inner circumferential surface of each of the plurality of openings in a direction of normal to the main surface of the permanent magnet.

3. The permanent magnet type rotating electric machine according to claim 2, wherein the first hole and the second hole are each set to have a form avoiding interference with a magnetic path of a magnetic flux by the stator passing inside the rotor core.

4. The permanent magnet type rotating electric machine according to claim 3, wherein the plurality of openings are arranged so that a pair of the plurality of openings forms a substantial V-shape pointing to the center of the rotor core, and the plurality of permanent magnets, in a state being inserted into the pair of openings, constitute a single magnetic pole.

5. The permanent magnet type rotating electric machine according to claim 2, wherein the first hole is arranged on the inner circumferential side of the rotor core and is substantially triangular, including a first side and a second side, each of the first side and the second side being separately substantially parallel to an adjacent one of the plurality of permanent magnets.

6. A permanent magnet type rotating electric machine, comprising:

a stator; and a rotor provided rotatably relative to the stator, the rotor comprising a rotor core having a plurality of openings formed along a circumferential direction, a plurality of permanent magnets, each individual one of the plurality of magnets being inserted into a separate one of the plurality of openings, to each form a magnetic pole, and a thermosetting filler infilling a gap between an inner circumferential surface of each of the plurality of openings and an outer circumferential surface of each of the plurality of permanent magnets, wherein the rotor core further comprises a first hole arranged between each of the magnetic poles of the rotor core and a second hole arranged at a substantial center of each of the magnetic poles of the rotor core and arranged along the circumferential direction of the rotor core to absorb deformation of the rotor core in a radial outward direction, wherein the first hole is either (a) substantially elliptical with a major axis that lies in a radial direction of the rotor core or (b) located on an inner circumferential side of the rotor core and is substantially triangular, including a first side and a second side, each of the first side and the second side being separately substantially parallel to an adjacent one of the plurality of permanent magnets, and wherein the second hole is substantially triangular and includes a first side and a second side, each of the first side and the second side being separately substantially parallel to an adjacent one of the plurality of permanent magnets.

7. The permanent magnet type rotating electric machine according to claim 6, wherein the first hole is arranged to absorb stress acting on the inner circumferential surface of each of the plurality of openings in parallel with a main surface of the permanent magnet, and the second hole is arranged to absorb stress acting on the inner circumferential surface of each of the plurality of openings in a direction of normal to the main surface of the permanent magnet.

8. The permanent magnet type rotating electric machine according to claim 7, wherein the first hole and the second hole each set to have a form avoiding interference with a magnetic path of a magnetic flux by the stator passing inside the rotor core.

9. The permanent magnet type rotating electric machine according to claim 8, wherein the plurality of openings are arranged so that a pair of the plurality of openings forms a substantial V-shape pointing to the center of the rotor core, and the plurality of permanent magnets, in a state being inserted into the pair of openings, constitute a single magnetic pole.

10. The permanent magnet type rotating electric machine according to claim 7, wherein the first hole is arranged on an inner circumferential side of the rotor core and is substantially triangular, including a first side and a second side, each of the first side and the second side being separately substantially parallel to an adjacent one of the plurality of permanent magnets.

* * * * *